// United States Patent //

(12) United States Patent
Adachi et al.

(10) Patent No.: US 7,522,752 B2
(45) Date of Patent: Apr. 21, 2009

(54) CENTRAL LOCATION OF A FACE DETECTING DEVICE, METHOD AND PROGRAM

(75) Inventors: Yoshihiro Adachi, Kariya (JP); Takeshi Hayashi, Kariya (JP); Junya Kasugai, Kariya (JP); Isahiko Tanaka, Susono (JP); Nobuyuki Shiraki, Owariasahi (JP); Michinori Ando, Tajimi (JP); Yoshiki Ninomiya, Nagoya (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 703 days.

(21) Appl. No.: 11/212,586

(22) Filed: Aug. 29, 2005

(65) Prior Publication Data

US 2006/0045317 A1    Mar. 2, 2006

(30) Foreign Application Priority Data

Aug. 27, 2004    (JP)    ............................. 2004-249008

(51) Int. Cl.
*G06K 9/00* (2006.01)
*G06K 9/66* (2006.01)
*G06K 9/46* (2006.01)
*H04N 9/47* (2006.01)

(52) U.S. Cl. .................... 382/118; 382/101; 382/128; 382/190; 382/199; 382/203; 348/77; 348/94; 348/143

(58) Field of Classification Search ............... 382/101, 382/103, 107, 118, 128–132, 190, 199, 203; 348/77, 94, 143
See application file for complete search history.

(56) References Cited

U.S. PATENT DOCUMENTS

| 5,832,115 | A | 11/1998 | Rosenberg et al. |
| 5,859,921 | A * | 1/1999 | Suzuki ....................... 382/118 |
| 6,389,155 | B2 | 5/2002 | Funayama et al. |
| 6,548,804 | B1 * | 4/2003 | Yuhara et al. ............... 250/221 |
| 6,707,933 | B1 | 3/2004 | Mariani et al. |

(Continued)

FOREIGN PATENT DOCUMENTS

JP    11-15947 A    1/1999

(Continued)

OTHER PUBLICATIONS

Roberto Brunelli and Tomaso Poggio, "Face Recognition Features versus Templates", 1993, IEEE Transactions on Pattern Analysis and Machine Intelligence, vol. 15, No. 10, pp. 1042-1052.*

(Continued)

*Primary Examiner*—Matthew C Bella
*Assistant Examiner*—Manav Seth
(74) *Attorney, Agent, or Firm*—Sughrue Mion, PLLC

(57) ABSTRACT

A central location of a face detecting device comprises an image input means for inputting a captured face image, a horizontal edge detecting means for detecting a horizontal edge having a predetermined vertical length based on the face image inputted by the image input means; and a central location of a face detecting means for calculating an average value of a horizontal location data of the horizontal edge detected by the horizontal edge detecting means, and determining the average value as a central location of the face.

12 Claims, 12 Drawing Sheets

U.S. PATENT DOCUMENTS

| | | | |
|---|---|---|---|
| 7,146,028 B2* | 12/2006 | Lestideau | 382/118 |
| 7,272,243 B2* | 9/2007 | Toyama | 382/103 |
| 7,286,692 B2* | 10/2007 | Kanarat | 382/118 |
| 2006/0045382 A1 | 3/2006 | Adachi et al. | |

FOREIGN PATENT DOCUMENTS

| | | |
|---|---|---|
| JP | 2000-339476 A | 12/2000 |
| JP | 2000339476 A | 12/2000 |
| JP | 2001-291108 A | 10/2001 |
| JP | 2004-094491 A | 3/2004 |

OTHER PUBLICATIONS

P.S. De Souza Coelho: "Enhancing the Bayesian Network Approach to Face Detection" Computer Science Society, 1999 Proceedings. SCCC '99. XIX International Conference of the Chilean Talca, Chile, Nov. 11-13, 1999, Los Alamitos, CA, USA, IEEE Comput. Soc., US, Nov. 11, 1999, pp. 150-159, XP010365294.

Jun Miao, et al.: "Hierarchical Multiscale and Multiangle System for Human face detection in a complex background using gravity-center template", Pattern Recognition Elsevier UK, vol. 32, No. 7, Jul. 1999, pp. 1237-1248, XP002352897, ISSN: 0031-3203.

* cited by examiner

F I G. 12
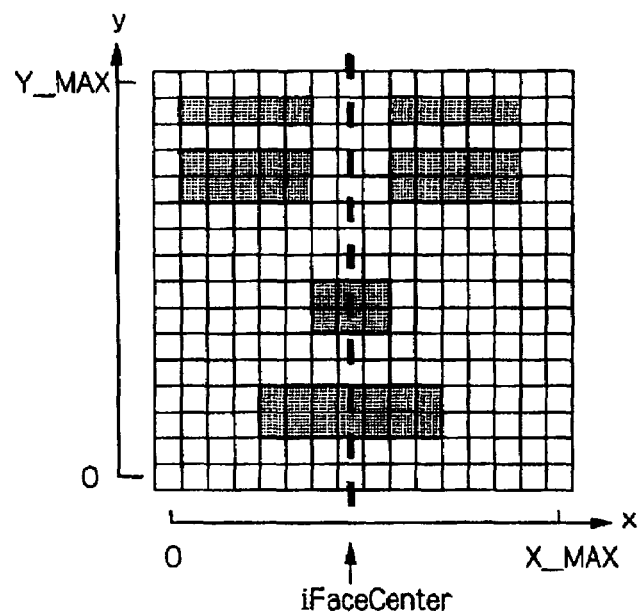
F I G. 13
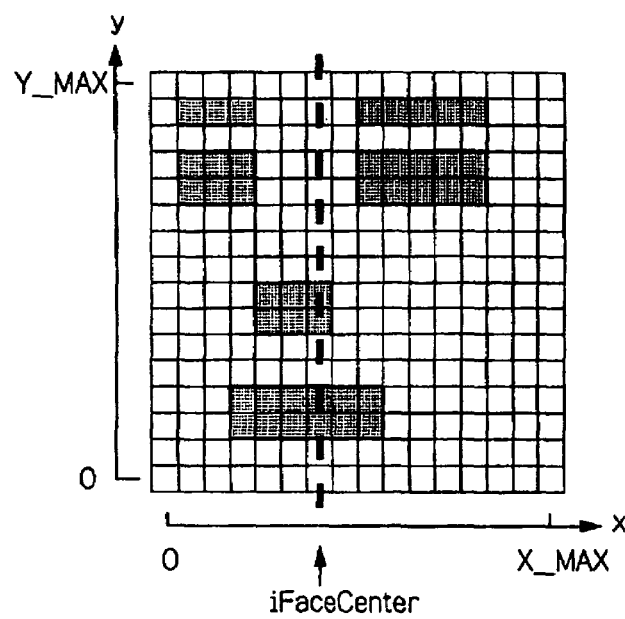

CENTRAL LOCATION OF A FACE DETECTING DEVICE, METHOD AND PROGRAM

CROSS REFERENCE TO RELATED APPLICATIONS

This application is based on and claims priority under 35 U.S.C. § 119 to Japanese Patent Application 2004-249008, filed on Aug. 27, 2004, the entire content of which is incorporated herein by reference.

FIELD OF THE INVENTION

The present invention relates to a central location of a face detecting device, method and program. More particularly, the present invention relates to a central location of a face detecting device, method and program for detecting a central location of the face based on a captured face image.

BACKGROUND

In order to identify individuals based on his/her face image or read his/her expression, it is important to detect a face direction, in other words, a central location of the face.

A known image processor capable of detecting a face direction from an inputted face picture of an unspecified individual without previously acquiring the face image data of the object has been disclosed in, for example JP2001-291108A. In this known image processor, an average front face picture data is generated based on plural sample front face picture data, and then average face model data is generated by mapping the average front face picture data onto standard face shape model data.

Based on the degree of correlation between the inputted picture and an average face picture data by angles at a time when the average face model data is seen from a predetermined angle, a face direction in the input picture can be detected.

In addition, a known face orientation estimating device disclosed in JP2004-94491A detects an angle of the face in a captured image. Specifically, the face orientation estimating device rotates an assumed 3D face model, which corresponds to a face line and positions of the eyes prepared in advance, in various angles so as to match to an input image and determine an angle of the model at which fie image matches to the face line and the positions of the eyes.

However, according to the image processor disclosed in JP2001-291108A, templates depending on various sizes of face and various face directions need to be prepared and, because the input picture needs to be matching calculated with each of templates, it has imposed an enormous load on the image processor.

On the other hand, the face orientation estimating device disclosed in JP2004-94491A uses a flat template, however, because human faces, especially hair styles significantly differ among individuals, a lines of his/her face and positions of eyes does not agree with the flat template many times.

In this condition, considering such differences, if the individuals are matched with such flat templates, a great number of face models need to be prepared in advance, as a result, the amount of the processes is increased.

A need exist to provide a central location of a face detecting device, method and program by which calculation load is reduced without face model data.

SUMMARY OF THE INVENTION

According to an aspect of the present invention, a central location of a face detecting device comprises an image input means for inputting a captured face image, a horizontal edge detecting means for detecting a horizontal edge having a predetermined vertical length based on the face image inputted by the image input means; and a central location of a face detecting means for calculating an average value of a horizontal location data of the horizontal edge detected by the horizontal edge detecting means, and determining the average value as a central location of the face.

According to another aspect of the present invention, a method for detecting a central location of a face includes processes of detecting a horizontal edge having a predetermined vertical length based on a captured face image, calculating an average value of horizontal location data of detected horizontal edge and determining the average value as a central location of the face.

According to further aspect of the present invention, a program for detecting a central location of a face instructs a computer to execute processes of detecting a horizontal edge having a predetermined vertical length based on the captured face image, calculating an average value of a horizontal location data of the detected horizontal edge, and determining the average value as the central location of the face.

According to still further aspect of the present invention, a central location of a face detecting method comprises steps of generating an edge portion abstracted image by differentiating values of picture elements in the face image in a horizontal direction, generating a picture elements time differentiated image in which the values of the picture elements in the face image are time-differentiated in order to emphasize an object that is able to make some movements, generating a composite image by combining the edge portion abstracted image and the picture elements time differentiated image, generating two histograms by projecting values of picture elements in the edge portion abstracted image and values of picture elements in the picture elements time differentiated image in a vertical direction, detecting peaks from the histogram of the composite image, selecting two peaks, which corresponds to a width of the human face, from the histogram; and determining these two peaks as left and right ends of the human face.

BRIEF DESCRIPTION OF THE DRAWINGS

The foregoing and additional features and characteristics of the present invention will become more apparent from the following detailed description considered with reference to the accompanying drawings, wherein:

FIG. 9 B illustrates a diagram indicating an abstracted white-black-white edge;

FIG. 12 illustrates a diagram in which a x-coordinate and a y-coordinate are set in the horizontal edges of the face image;

FIG. 13 illustrates a diagram indicating a central location of the face, when the driver turns his face in sideways, detected by the central location of a face detecting device according to the first embodiment;

DETAILED DESCRIPTION

Embodiments of the present invention will be explained with reference to attached drawing figures. In examples of these embodiments, a vehicle driver's face is captured in order to detect a central location of the driver's face, however, the object is not limited to the driver's face, and a central location of a face of any individual can be detected.

First Embodiment

Figure 1:
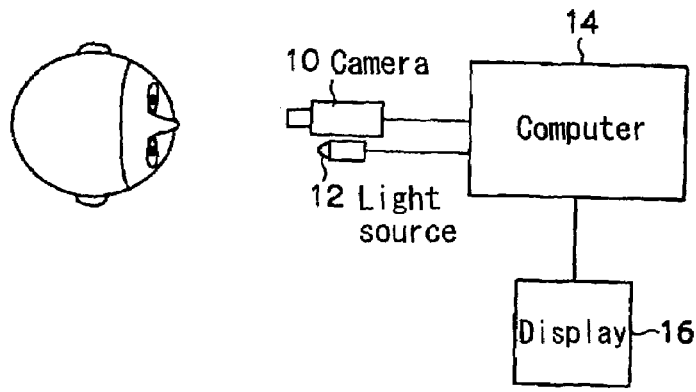
FIG. 1 illustrates a diagram indicating a configuration of a central location of a face detecting device in the first embodiment according to the present invention.

FIG. 1 illustrates a configuration of a central location of a face detecting device according to a first embodiment of the present invention.

The central location of a face detecting device includes a camera 10 (i.e., serving as a capturing means) capturing a driver's face in order to generate an original image, a light source 12 for providing light to the drivers face, a computer 14 for detecting a central location of the driver's face (i.e., the computer 14 serves as a central location of a face detecting means) and a display device 16 connected to the computer 14.

The original image generated by means of the camera 10 includes not only the driver's face but also a background image of the driver. Further, the display device 16 is comprised of a LCD (Liquid Crystal Display) or a CRT (Cathode Ray Tube) for displaying a binary image (black and white), which is abstracted from the original image captured by means of the camera 10.

Figure 2:
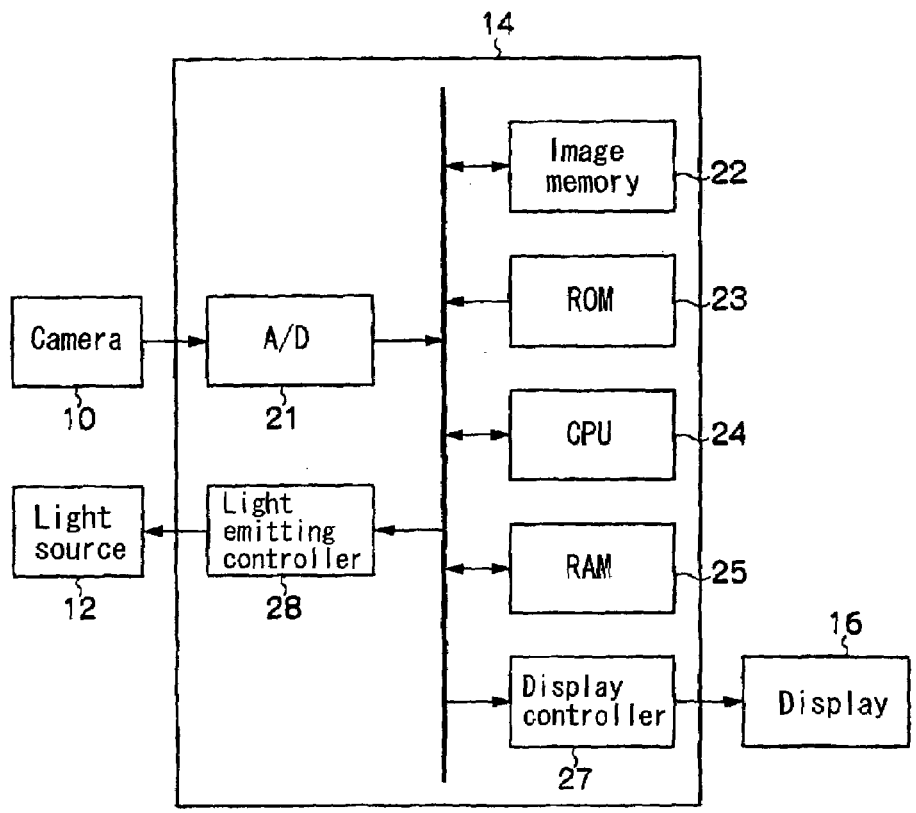
FIG. 2 illustrates a block diagram indication a configuration of a computer.

FIG. 2 illustrates a block diagram indicating a configuration of the computer 14.

The computer 14 includes an analog /digital (A/D) converter 21 for converting the captured image by the camera 10 into digital signals, an image memory 22 memorizing the original image generated by the camera 10, a ROM 23 in which program for detecting a central location of the face is stored (i.e., the ROM 23 serves as the central location of a face detecting means), a CPU 24 for executing a predetermined calculation based on the program memorized in the ROM 23, a RAM 25 performs as a work area of data, a display controller 27 for controlling the display device and a light emitting controller 28 for controlling the light source so as to be on and off.

Figure 3:
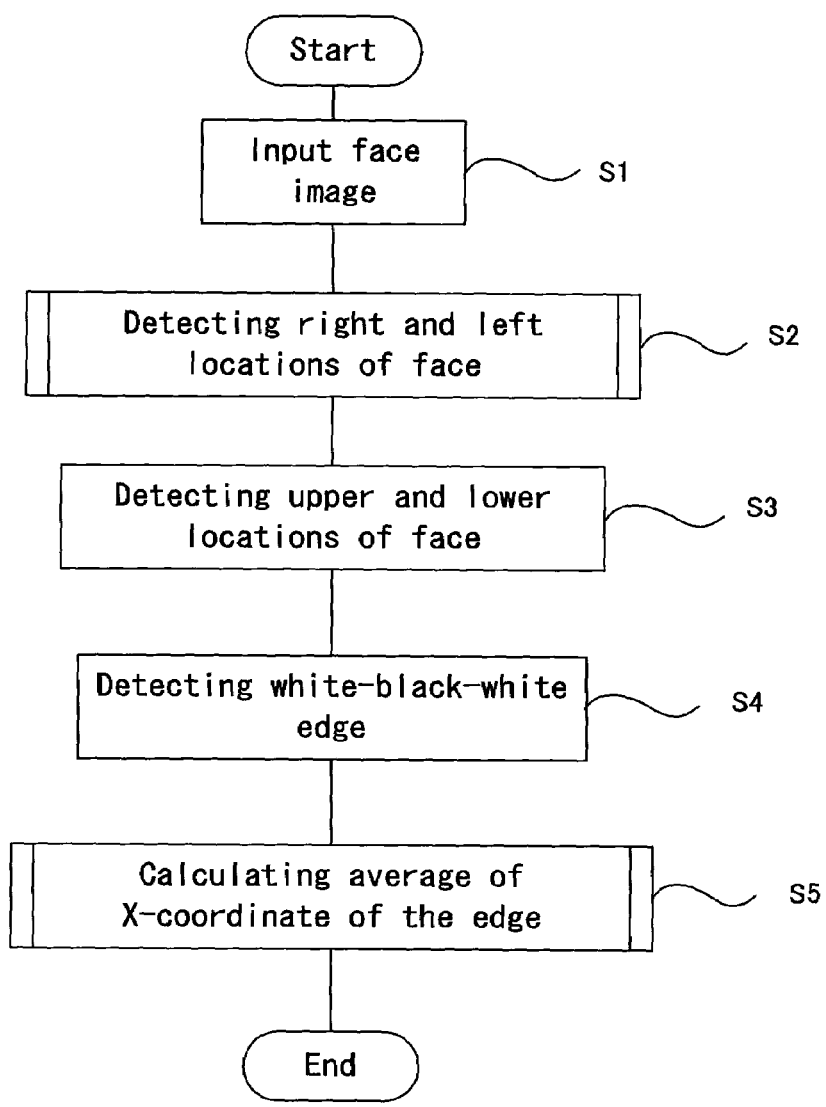
FIG. 3 illustrates a flow chart indicating a processing routine of a program for detecting a central location of a face, which is memorized in a ROM.

FIG. 3 illustrates a flow chart of a processing routine of the program memorized in the ROM 23. Specifically, the CPU 24 executes from steps S1 to S5 in this processing routine.

In the step S1, the CPU 24 inputs an original image, which is captured by the camera 10, into the computer 14, and this original image is written on the image memory 22 by means of the A/D converter 21 (i.e., the CPU 24 serves as an image input means). Then, the process proceeds to the step S2.

In the step S2, the CPU 24 detects left and right positions of the driver's face, in other words, left and right ends of the driver's face. Specifically, the CPU 24 calculates vertical edges of the face image and creating a histogram by projecting the calculated vertical edges in a vertical direction. At this point, because its peaks exist at both end portions of the face in a horizontal direction, the peaks can be determined as both ends of the face, in other words left and right ends. Further, it is preferable that each picture elements (unit areas) are weighed by means of a time subtraction or length in order to eliminate noise elements (objects in the back ground such as a head lest or a window frame). The left and right ends of the face can be detected by another method, such as a template matching or a range image. Specifically, the CPU 24 executes following steps S11 to S15 (i.e., the CPU 24 serves as a face length detecting means).

Figure 4:
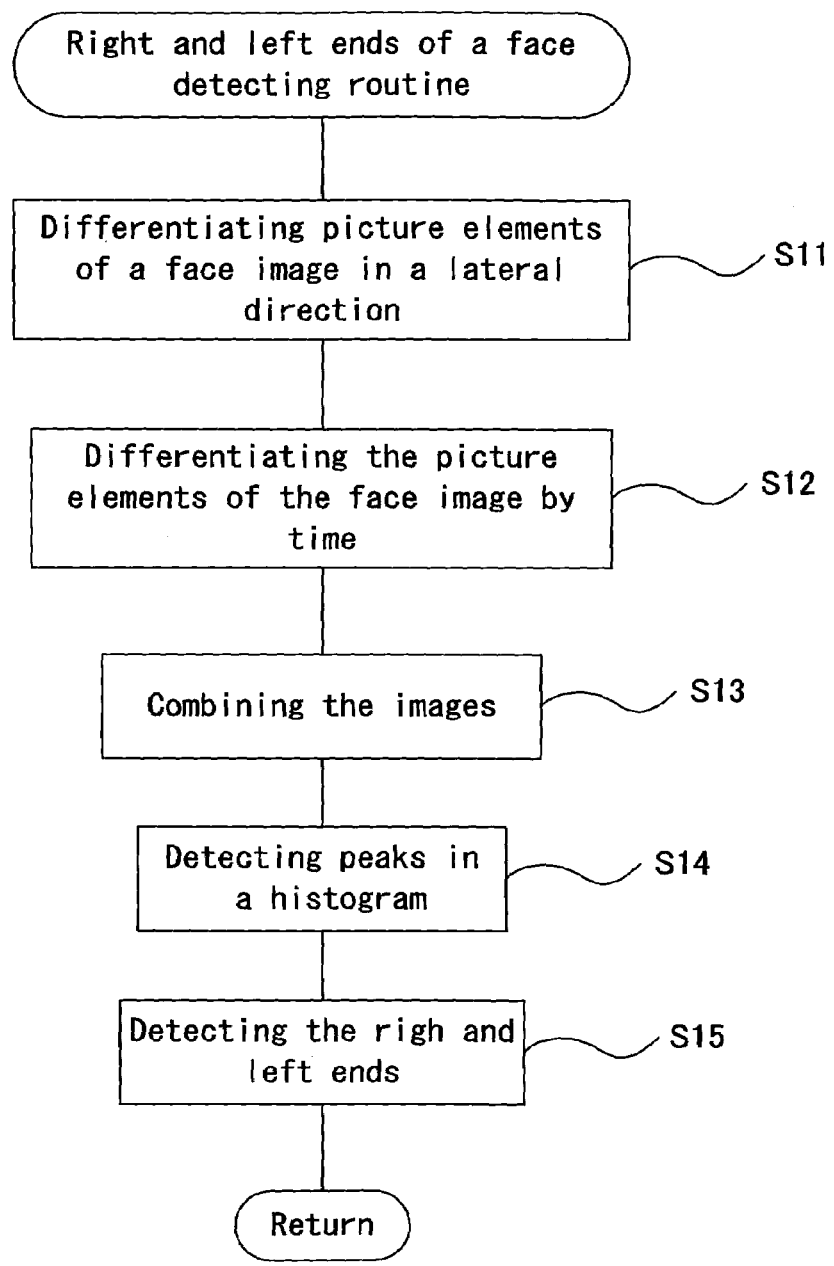
FIG. 4 illustrates a flow chart indicating an example of a right and left ends of a face detecting routine in a step S2.

FIG. 4 illustrates a flowchart of a right and left ends of a face detecting routine executed in the step S2. Each of drawings from FIG. 5A to FIG. 5F indicates an image generated in each of the processes in the right and left ends of a face detecting routine.

In the step S11, the CPU 24 reads the face image (FIG. 5A) from the image memory 22 and differentiates picture elements of the face image in a lateral direction (in a horizontal direction).

Specifically, in the step S11, a difference between a luminance degree of each of the picture elements and a luminance degree of each of abutting picture elements are calculated, and based on such differences, an edge portion abstracted image (FIG. 5B) is generated. Then the process goes to the step S12.

Figure 5:
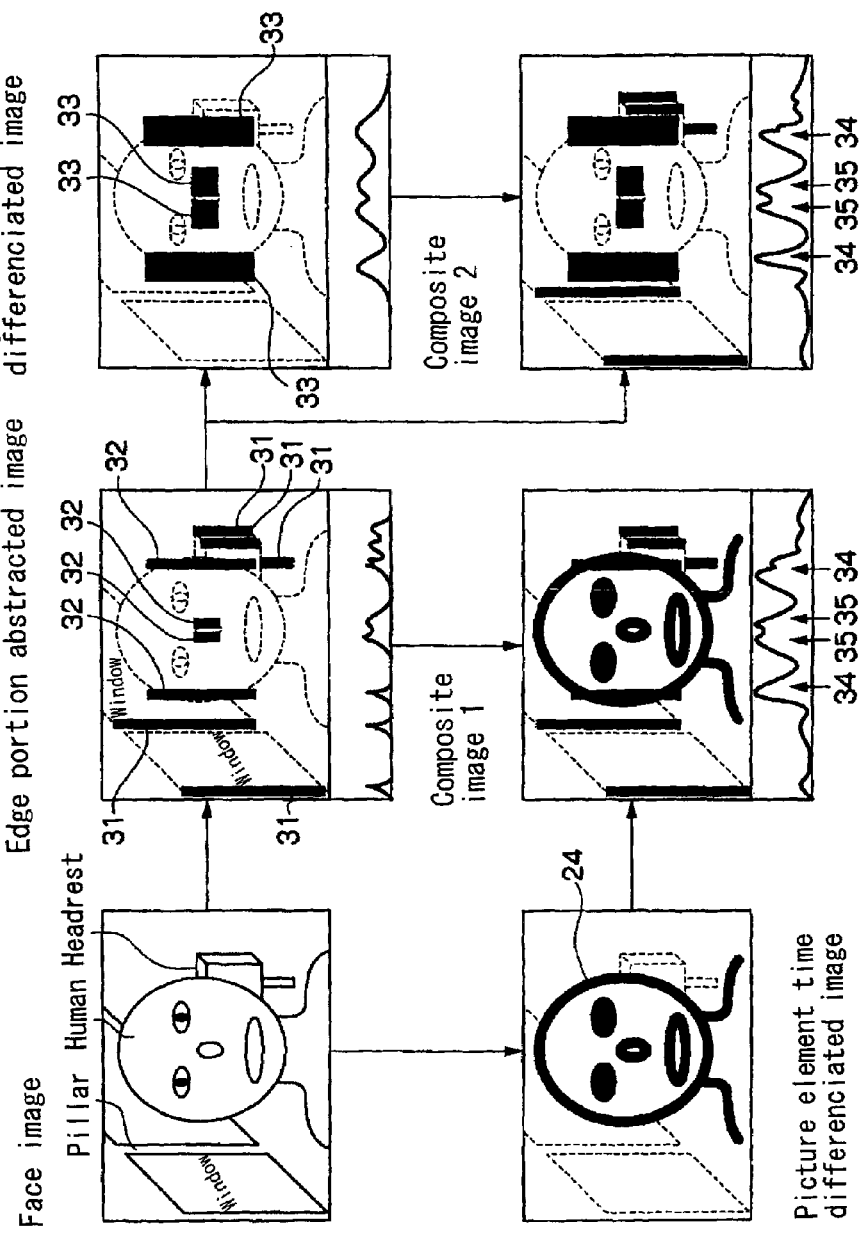
FIG. 5 illustrates diagrams indicating images generated in each process of the right and left ends of a face detecting routine.

In FIG. 5B, outlines of objects, witch are captured in the face image (FIG. 5A), are indicated with a dotted lines for convenience.

As shown in FIG. 5B, in the edge portion abstracted image, only vertical edges 31 of the background objects and vertical edges 32 of the face image are abstracted, and another edges of the objects captured in the original face image (FIG. 5A) are scarcely abstracted.

These vertical edges 31 and 32 are abstracted even when the driver does not move.

The picture elements in the edge portion abstracted image (differentials of the luminance degrees) is projected in a lengthwise direction (in a vertical direction) as a histogram shown in the bottom of FIG. 5B.

In this histogram, because values of all edge portions are approximately equal, both edges of the face cannot be specified.

In the step S12, the CPU 24 reads the original image (FIG. 5A) from the image memory 22 differentiates the picture elements of the original image by time.

Specifically, by calculating a difference between a luminance degree of each picture element at certain time and a luminance degree of each picture element at an immediately preceding time, a picture elements time-differentiated image, in which only the moving object is emphasized, is generated. Then, the process goes to the step S13.

Generally, because the driver does not stop his/her movement during driving, in the picture elements time-differentiated image, only the outlines of the moving object, such as the driver's face, is detected with thick outlines.

On the other hand, because another objects in the background, such as a window, a pillar and a head rest, remain stationary, these objects are not detected in the picture elements time-differentiated image. However, in case the driver hardly moves at all, the outlines of the driver cannot be detected in the picture elements time differentiated image. In order to avoid this problem, following processes need to be executed.

In steps S13 and S14, the CPU 24 generates a composite image 1 (FIG. 5D) and a histogram, Specifically, the composite image 1 is made by combining the edge portion abstracted image and the picture elements time differentiated image, and the histogram is made by projecting the picture elements (luminance degrees) of the composite image 1 in a vertical direction.

Thus, even when the driver is not moving, vertical edges and outlines of all drivers are shown in the composite image 1, in which the edge portion abstracted image and the picture elements time differentiated image are combined.

Alternatively, the picture elements in the edge portion abstracted image are projected in a vertical direction so as to generate a histogram, and the picture elements in the picture elements time differentiated image is also projected in a vertical direction so as to generate a histogram, and these two histograms can be combined. Then, plural peaks 34 and 35 are detected in the histogram of the composite image 1, and the process goes to a step S15.

In the step S15, the CPU 24 selects two peaks, which shows best match to a face width of a human, from the plural peaks 34 and 35 detected from the histogram of the composite image 1, and assume these two peaks as left and right ends of the face. At this point, the process has finished the right and left ends of a face detecting routine, and goes back to the step S2 shown in FIG. 3.

The right and left ends of a face detecting routine is not limited to the above processes, and may be altered as follow.

For example, in the step S12, the CPU 24 time-differentiates the picture elements based on the original image (FIG. 5A), however, it can be calculated based on the edge portion abstracted image (FIG. 5B) instead.

Specifically, in the step S12, the picture elements in the edge portion abstracted image (FIG. 5B) is differentiated by time in order to generate an edge portions time differentiated image (FIG. 5E).

Thus, vertical edges 31 and 32 of the objects in the background, such as the window and the head rest, can be deleted from the vertical edges 31 and 32 shown in the edge portion abstracted image FIG. 5B, as a result, only vertical edges 33 of the face image, which is making some movements, can be abstracted as shown in FIG. 5E.

In this altered process, after the step S13, the CPU 24 executes similar processes as the above. In the steps S13 and S14, the CPU 24 combines the edge portion abstracted image and the edge portions time differentiated image in order to generate a composite image 2 (FIG. 5F), and projects picture elements (luminance degrees) of the composite image 2 in a vertical direction in order to generate a histogram. Based on this histogram, the peaks 34 and 35 can be detected.

Figure 6:
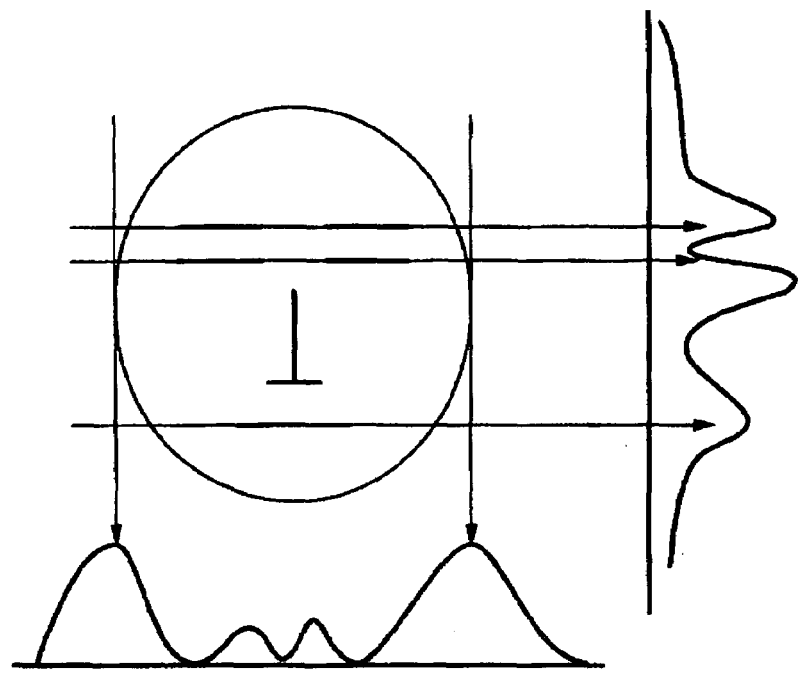
FIG. 6 illustrates a diagram indicating a condition in which left and right ends of the face is detected in a step S2, and a condition in which upper and lower ends of the face is detected in another process.

FIG. 6 illustrates a diagram indicating the left and right ends of the face, which is detected through the process in the step S2, and upper and lower positions of the face, which will be detected through the processed described below.

As shown in FIG. 6, the CPU 24 selects two peaks, which make best match to the two peaks corresponding to humans face width, and assume these two peaks as left and right ends of the face. Thus, executing the right and left ends of a face detecting routine, the CPU 24 can detect both ends of the face, not affected by the background or the movements of the driver. Then, the process goes to the step S3 shown in FIG. 3.

In the step S3, the CPU 24 generates a histogram by projecting horizontal edges within a face width range in a horizontal direction.

In this histogram, peaks exist at portions, which correspond to eyebrows, eyes, and mouth. Thus, as shown FIG. 6, the upper point and the lower point of the face are estimated based on the peaks in the histogram, and then the process goes to the step S4 (i.e., the CPU 24 serves as the face length detecting means).

The method for detecting the left and right ends of the face or the method for detecting the upper and lower points of the face is not limited to the above explained methods, and another method, such as a template matching or a range image can be used alternatively.

In the step S4, using a predetermined threshold, the CPU 24 detects horizontal edges (white-black-white edges) from the face image, which is captured by the camera 10 and memorized in the image memory 22 (i.e., the CPU 24 serves as a horizontal edge detecting means). In the horizontal edges (white-black-white edges), picture elements changes, in a vertical direction, from white to black, and then changes from black to white. Then, the process goes to a step S5.

In this image, white indicates a picture element whose luminance degree is above the predetermined threshold, and the black indicates a picture element whose luminance degree is below the predetermined threshold.

Figure 7:
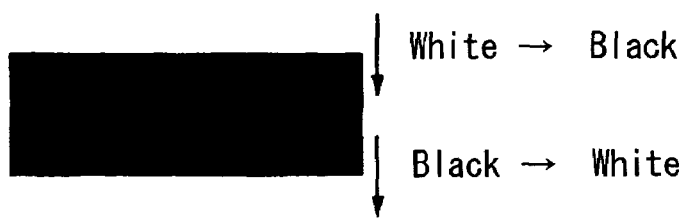
FIG. 7 illustrates a diagram explaining a white-black-white edge.

FIG. 7 is a diagram explaining a white-black-white edge. As shown in FIG. 7, the white-black-white edge indicates a horizontal edge that changes white to black, and then black to white in a vertical direction and has a predetermined width, and not edge between white and black.

Figure 8A:
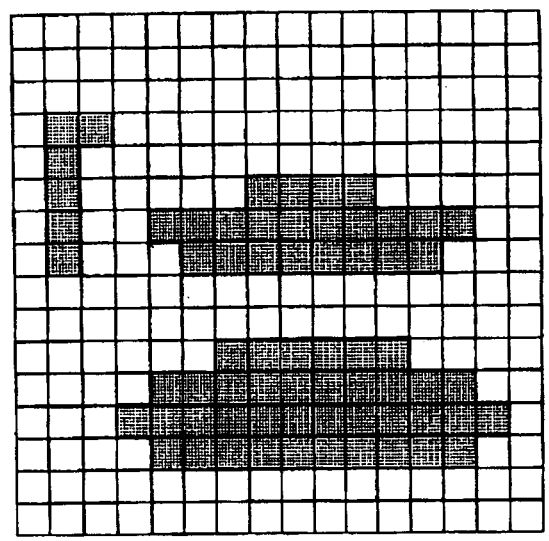
FIG. 8A illustrates a diagram indicating an input image.
Figure 8B:
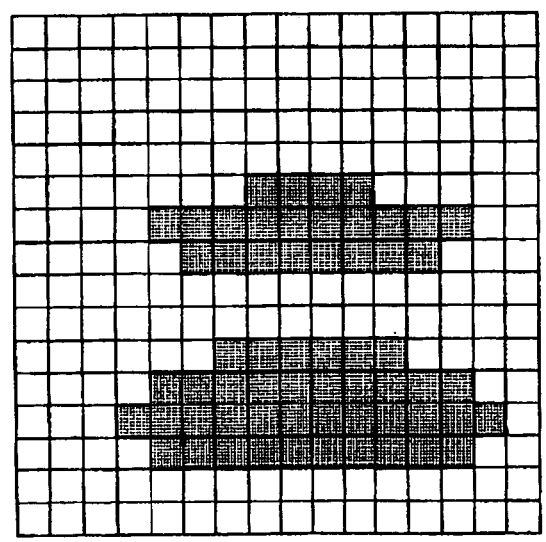
FIG. 8B illustrates a diagram indicating a white-black-white edge obtained from an input image.

FIG. 8A illustrates a diagram indicating an input image, and FIG. 8B illustrates a diagram indicating white-black-white edges obtained from the input image.

Specifically, in step S4, for example when the vertical length of the face in the image is 60 pixel, the CPU 24 detects black picture elements with 2-4 pixel in a vertical direction, in other words, detects a picture element whose luminance degree is relatively low. In this process, black picture elements whose width is 1 pixel or below can be deleted as noise elements.

Further, by limiting the vertical length at 4 or below, only edges of facial parts (eyebrows, eyes, nose, mouth) can be detected as shown in FIG. 8B. In this case, the length of the face is 60 pixel, and edges whose vertical length is between 2 and 4 pixel are detected, however, the vertical length of the edge is not limited to this value. The criteria can be changed depending on the vertical length of the face.

Further, the CPU 24 calculates a face width based on the left and right ends detected in the step S2. Further, the CPU 24 detects abstracted white-black-white edges selected from the white-black-white edges, specifically, detects the abstracted white-black-white edge which has a horizontal width of a predetermined value or more, for example 10% of the face width.

Figure 9A:
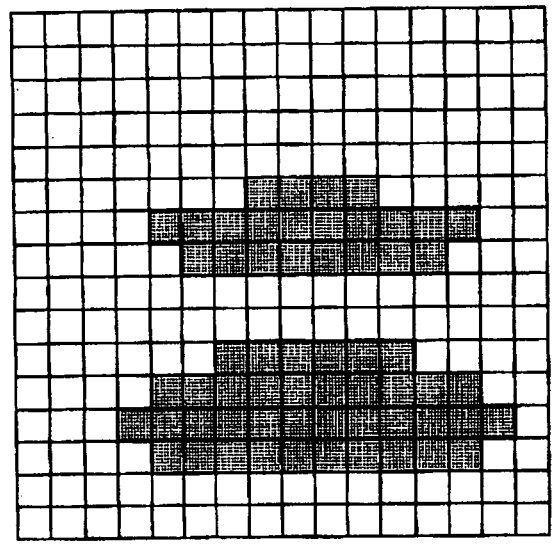
FIG. 9 A illustrates a diagram indicating a white-black-white edge.
Figure 9B:
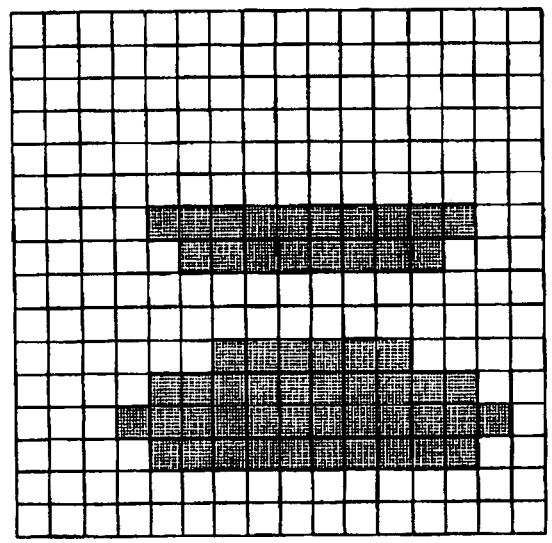
Figure 10:
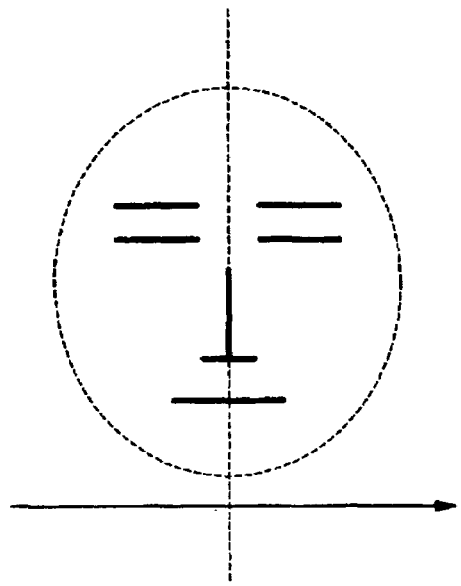
FIG. 10 illustrates a diagram indicating horizontal edges of the entire face image.

FIG. 9A illustrates a diagram indicating the white-black-white edges, FIG. 9B illustrates a diagram indicating the abstracted white-black-white edges, and FIG. 10 illustrates a diagram indicating the abstracted white-black-white edge existing in the entire face image. Thus, short horizontal edges of noise can be deleted from the image. As mentioned above, the criteria value is set at 10% of the face width. This is because, based on statistical data, a width of each facial parts is generally 10% or more of the face width, and an edge having a width of 10% or more can be considered as not being facial parts. The criteria value is not limited to 10% and may be changed to another value unless it can be used to delete noise in horizontal direction. Hereinbelow the abstracted white-black-white edge is referred to as a horizontal edge.

In the step S5, the CPU 24 calculates an average value of x-coordinates (horizontal location data) of the picture elements, which comprises the horizontal edge and determines the average value as a central location of the face iFaceCenter.

Figure 11:
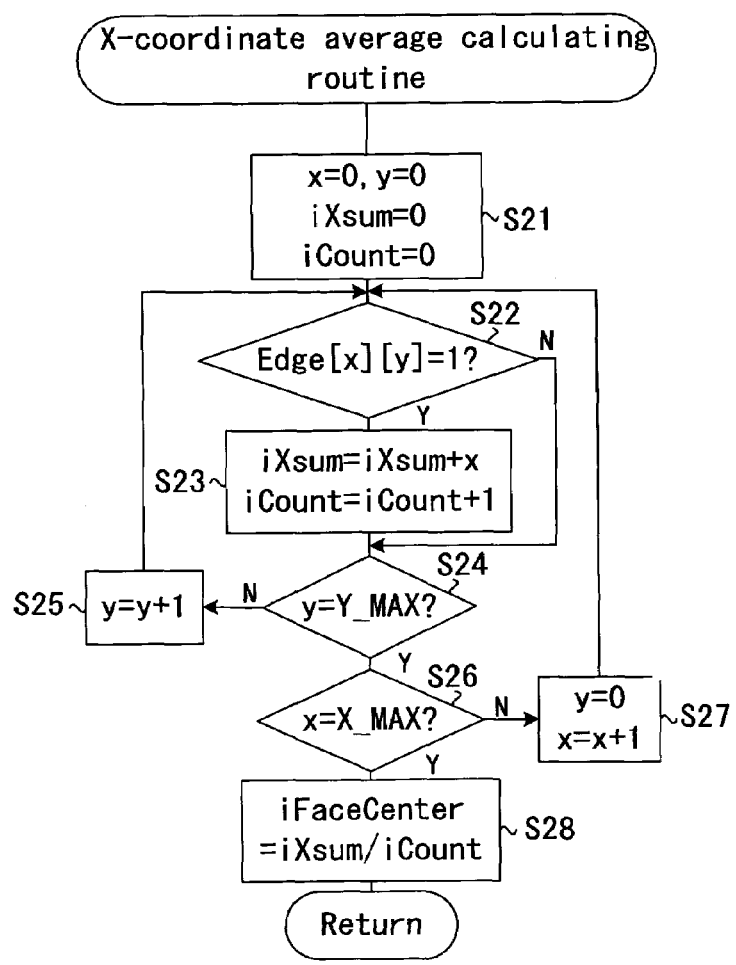
FIG. 11 illustrates a flow chart indicating an example of a x-coordinate average value calculating routine in a step S5.

FIG. 11 illustrates a flow chart indicating an example of routines for calculating a X-coordinate average value in step S5. In other words, CPU 24 executes processes from a step S21 to a step 28.

In the step S21, parameters are initialized. Specifically, parameters x, y, iXsum, iCount are set to be 0, and the process goes to the step S22.

FIG. 12 illustrates a diagram in which a x-coordinate and a y-coordinate are set in the horizontal edges of the face image. The "x" represents the x-coordinate of entire the image, and X_MAX represent a maximum value of the x-coordinate.

The "y" represents the y-coordinate of entire the image, and Y_MAX represent a maximum value of the y-coordinate. An iXsum represents a value which is obtained by summing each x-coordinate of a picture element in which a horizontal edge exist, and iCount represents a count value which is obtained by counting a picture element in which a horizontal edge exist.

In a step S22, it is determined whether or not a horizontal edge exists in the picture elements of the coordinates (x, y). In other words, it is determined whether Edge [x][y] is 1 or 0. Specifically, the Edge [x][y] is a binary digit (0=edge, 1=non edge) indicating whether or not a horizontal edge exists in the picture elements of the coordinates (x, y). In the step S22, if the CPU determines the Edge [x][y] is 0, the process goes to a step S24. On the other hand, if the CPU determines the Edge [x][y] is 1, the process goes to a step S23.

In the step S23, x-coordinate is added to iXsum (iXsum=iXsum□x), and iCount is incremented (iCount=iCount□1). Then, the process goes to a step S24.

In the step S24, it is determined whether or not the y-coordinate is the maximum value Y_MAX. If the y-coordinate is Y_MAX, the process goes to a step S26, and if not, the process goes to a step S 25. In the step S25, the y-coordinate is incremented (y=y□1), and then the process goes back to the step S22.

In the step S26, it is determined whether or not the x-coordinate is the maximum value X_MAX. If the x-coordinate is X_MAX, the process goes to a step S28, and if not, the process goes to a step S 27. In the step S27, the y-coordinate is set to 0, and the x-coordinate is incremented (x=x□1), and then the process goes back to the step S22.

Thus, through the step S22 to the step S26, the horizontal edges in the entire image are scanned, and when a picture element comprising the horizontal edge is detected, x-coordinate of the picture element is added, at the same time, the number of adding operations is counted.

In the step S28, an average value of the x-coordinates the picture elements in which the horizontal edge exists is calculated in order to obtain a central location of the face "iFaceCenter" The iFaceCenter can be calculated by formula (1).

$$iFaceCenter = \frac{iXsum}{iCount} \quad \text{formula (1)}$$

A reason for calculating the average value of the x-coordinates the picture elements in which the horizontal edge exists is follow.

Generally, parts of face such as eyebrows, eyes, nose, mouth are symmetrical, so that a central location of the face can be obtained by calculating the average value the x-coordinate the picture elements in which the horizontal edge exists.

Thus, in the step S28, central location of the face iFaceCenter can be obtained as shown in FIG. 12.

As mentioned above, the central location of a face detecting device in the first embodiment of the present invention detects horizontal edges having a predetermined width from the face image and determines a central location of the face by calculating an average value of x-coordinates of the detected horizontal edges.

In this configuration, comparing to the known device in which the face image is matched to each of a large number of templates prepared in advance, a calculation load can be minimized in this embodiment, as a result, the central location of the face can be detected rapidly and certainly.

Second Embodiment

Next, a second embodiment according to the present invention will be explained. In the second embodiment, elements and processed that is same as the first embodiment are represented by the numerals used in the explanation of the first embodiment, and explanations of the same configurations will be skipped.

FIG. 13 illustrates the central location of the face of the driver, who turns his face in sideways, detected by the central location of a face detecting device of the first embodiment.

The central location of the face cannot be detected accurately when the driver does not faces the front of the camera 10.

When the driver does not face the front of the camera 10, horizontal edges representing an eyebrow and an eye on the direction in which the driver's face turns becomes relatively short as shown in FIG. 13, as a result, iFaceCenter, which is an average value of the x-coordinates of the horizontal edges, differs from the actual central location of the face.

To avoid such problem, the central location of a face detecting device in the second embodiment executes a weighted x-coordinate average calculating routine instead of the x-coordinate average calculating routine of the first embodiment shown in FIG. 11.

Figure 14:
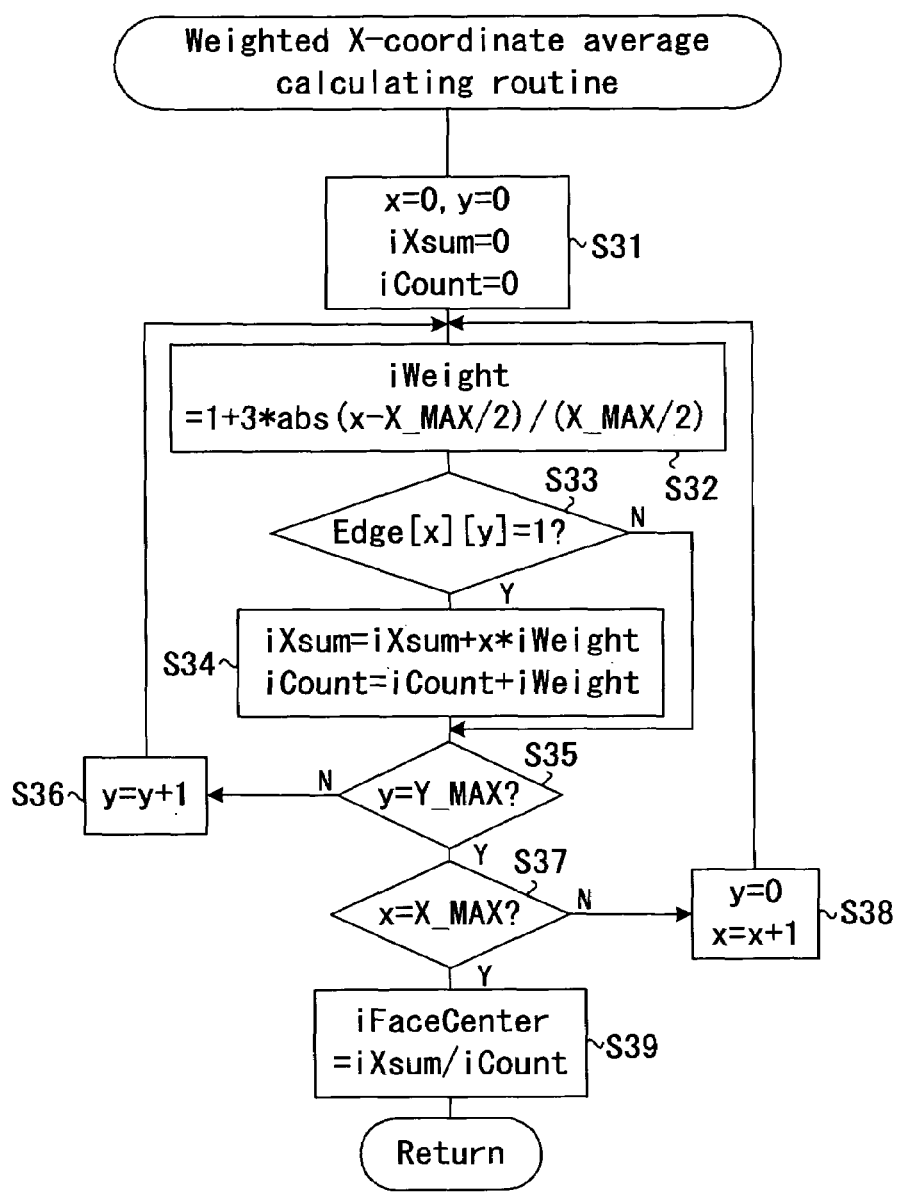
FIG. 14 illustrates a flow chart indicating a weighted x-coordinate average calculating routine.

FIG. 14 illustrates a flow chart indicating the weighted x-coordinate average calculating routine. In the step S5 of the FIG. 3, the CPU 24 in the computer 14 executes following steps S31 to S39.

In the step S31, parameters are initialized. Specifically, parameters x, y, iXsum, iCount are set to be 0, and the process goes to the step S32.

In the step 32, a weighting factor iWeight of the x-coordinate is calculated by formula (2).

$$iWeight = 1 + 3 \cdot abs\frac{x - X\_MAX/2}{X\_MAX/2} \qquad \text{formula (2)}$$

In this formula, abs is for calculating an absolute value of the parameter, and absX, for example, is represented by |X|.

When the x-coordinate exists at the central location of the image (x=X_MAX/2), the weighting factor iWeight becomes a maximum value 1, and when the x-coordinate exists at both ends of the image (x=0 or X_MAX), the weighting factor iWeight becomes a maximum value 4. Specifically, the weighting factor iWeight becomes a minimum value (local minimum value) when the x-coordinate is the central location of the image, and the weighting factor iWeight monotone increases as it moves from the central location of the image toward both ends.

The maximum value 4 of the weighting factor iWeight is an example, and the maximum value may be adjusted to be a preferable value based on a test.

In other words, the weighting factor iWeight is not limited to the value calculated by the formula (2), and may modified as long as the factor iWeight monotone increases as the x-coordinate moves from the central location of the image toward both ends.

Figure 15:
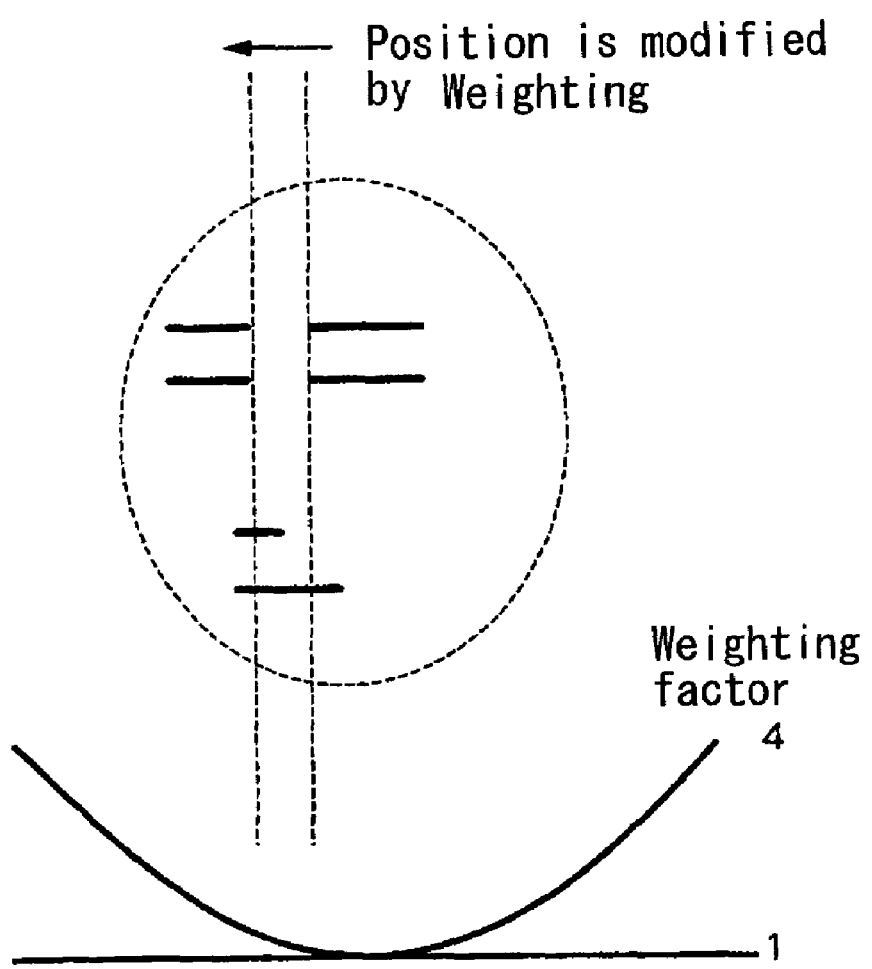
FIG. 15 illustrates a diagram explaining a modification of the central location of the face by means of the weighting factor.

FIG. 15 illustrates a diagram explaining the central location of the face, which is modified by use of the weighting factor.

As shown in the bottom portion in FIG. 15, the weighting factor monotone increases as the x-coordinate moves from the central location of the image toward the both ends.

The x-coordinate of the horizontal edge is weighed by use of the weighting factor, because the horizontal edge exist on both sides of the face can be weighed, the central location of the face can be modified.

In the step S33, it is determined whether or not a horizontal edge exists in the picture elements of the coordinates (x, y). In other words, it is determined whether Edge [x][y] is 1 or 0.

If the CPU determines the Edge [x][y] is 0, the process goes to a step S35. On the other hand, if the CPU determines the Edge [x][y] is 1, the process goes to a step S34.

In the step S34 the weighed x-coordinate is added to iXsum (iXsum=iXsum□x□iWeight), and weighting factor iWeight is added to iCount (iCount=iCount□iWeight), then the process goes to a step S35.

Processes from the steps S35 to S39 is same as the processes from the steps S24 to S28 shown in FIG. 11.

Thus, increasing the weight on the horizontal edge from the central location of the image towards the both end of the image, the CPU 24 calculates an average value of the weighed x-coordinates of the horizontal edges. Thus, even when the driver turns his face in sideways, and horizontal edges that represent an eyebrow or an edge become shorten, an average value of the x-coordinate can be calculated by weighing the short horizontal edges, as a result, a central location of the face can be accurately detected.

FIG. 16 A and FIG. 16 B illustrate central locations of the face detected by the central location of a face detecting device in the second embodiment.

Figure 16A:
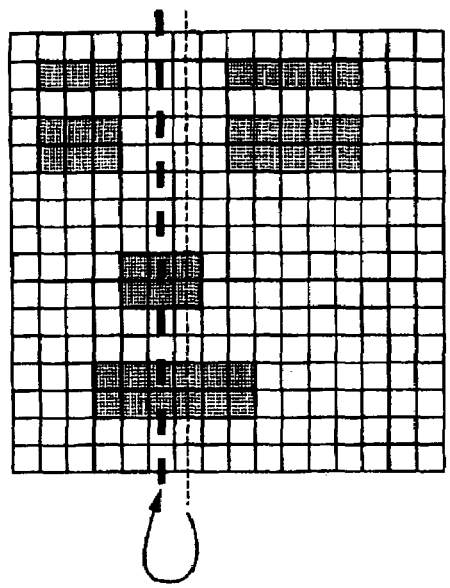
FIG. 16 A illustrates a diagram indicating a central location of the face detected by the central location of a face detecting device according to the second embodiment, and FIG. 16 B illustrates a diagram indicating a central location of the face detected by the central location of a face detecting device according to the second embodiment.

In FIG. 16 A, the central location of the face detected by the device of the second embodiment is indicated by a thick dotted line, and the central location of the face detected by the device of the first embodiment is indicated by a thin dotted line. The thick dotted line is located facing direction (leftward in FIG. 16A) relative to the thin dotted line, and the thick dotted line is locate at central of the horizontal edges, which represent nose and mouth.

Figure 16B:
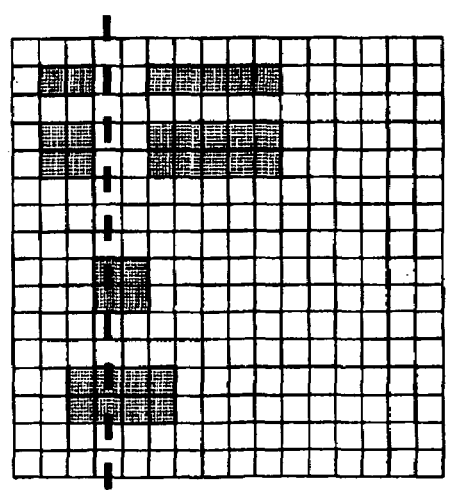

Further, as shown in FIG. 16B, even when the driver faces more leftward in FIG. 16B, the central location of the face (thick dotted line) is located at the central of the horizontal edges, which represent nose or mouth.

As mentioned above, the central location of a face detecting device in the second embodiment detect horizontal edges having a predetermined width from the face image, increases the weigh applied to the horizontal edge from the central location of the image toward both end of the image, calculates the average value of the weighed x-coordinates of the horizontal edges, and detects the central location of the face.

Thus, even when the driver turns his face in sideways, and the horizontal edge is shortened, this shortened horizontal edge can be covered by weighing thereto, as a result, a calculation load can be minimized in this embodiment, as a result, the central location of the face can be detected rapidly and certainly.

However, the present invention is not limited to the above first and second embodiments, and can be applied for versatile applications within the claims.

For example, instead of the program memorized in the ROM 23, the CPU 24 may read program memorized in an optical memory disk or a magnetic disk (not shown) in order to detect a central location of the face as explained above.

The processes in the embodiments are not limited to the processing routines explained in the embodiments and illustrated in the flow charts.

The image input means inputs the capture face image. This image includes not only a human face of the object, but also objects in a background. The image input means may input an image provided by the capturing means, which captures a human face in order to generate an image.

The horizontal edge detecting means detects, based on an image inputted by the image input means, a horizontal edge having a predetermined vertical length. The predetermined vertical length means a vertical length which corresponds to an eyebrow, an eye, a nose and a mouth. Thus, a very short edge caused by noise or an edge which is larger than the size of an eyebrow or an eye can be eliminated.

The central location of a face detecting means calculates an average value of the horizontal location data of the detected horizontal edges. At this point, because each of the detected horizontal edges corresponds to each of the facial parts, the horizontal edges symmetrically exist in the image. Thus, the average value of the horizontal location data of the horizontal edges is determined as a central location of the face.

Thus, the central location of a face detecting device, method and program according to the present invention detects a horizontal edge having a predetermined vertical length based on the captured face image, calculates the average value of the horizontal location data of detected horizontal edge, and determines the average value as the central location of the face, as a result, a calculation load can be reduced and the central location of the face can be detected rapidly and surely.

Further, the central location of a face detecting device may include a face length detecting means for detecting lengths of the face in one of a vertical direction and a horizontal direction based on an image inputted by the image input means. Furthermore, the horizontal edge detecting means may determine a range of one of a vertical length and a width of the horizontal edge based on the lengths of the face in one of a vertical direction and a horizontal direction detected by the face length detecting means, and detect a horizontal edge within the determined range.

The central location of a face detecting method may detect lengths of the face in one of a vertical direction and a horizontal direction based on the captured face image, and may determine a range of one of a vertical length and a width of the horizontal edge based on the lengths of the face in one of a vertical direction and a horizontal direction detected by the face length detecting means, and detect a horizontal edge within the determined range.

In the detected horizontal edge may include a short horizontal edge, which is generated by noise, or a horizontal edge of a large portions (e.g. hair), which is larger than the facial parts.

When such horizontal edges are detected, the central location of the face may not be detected correctly.

Thus, the present invention detects lengths of the face in a vertical direction and a horizontal direction, determines a range of the vertical length of the horizontal edge depending on the detected length, detects a horizontal edge within the determined range so as to eliminate horizontal edge of except the facial parts, as a result an appropriate horizontal edge can be detected.

According to the central location of a face detecting device, the central location of a face detecting means may calculates a weighting factor whose value becomes larger as the horizontal location data moves from the central location of the image toward both ends of the image in a horizontal direction, and determines an average value of the horizontal location data weighed by use of the weighting factor as the central location.

The central location of a face detecting method may calculates the a weighting factor whose value becomes larger as the horizontal location data moves from the central location of the image toward both ends of the image in a horizontal direction, and determines an average value of the horizontal location data weighed by use of the weighting factor as the central location of the face.

When the driver turns his face in sideways, the horizontal edge on the face direction is shortened. In this case, the average value of the horizontal location data of the horizontal edge calculated as a central location of the face is not accurate.

Thus, the present invention can calculates a weighting factor whose value is more weighed as the location moves from the central location of the image toward both ends of the image in a horizontal direction, and determines an average value of the horizontal location data weighed by use of the weighting factor as the central location of the face. Thus, because the shortened horizontal edge can be further weighed, the central location of the face can be accurately detected.

Further, according to the central location of a face detecting device, the central location of a face detecting means may calculates the horizontal location data additional value by adding, each time when an unit area comprising the horizontal edge is detected in the image in which the horizontal edge is detected, the horizontal location data of the unit area, and the central location of the face is detected based on the horizontal location data additional value and the number of adding operations The central location of a face detecting method may calculates the horizontal location data additional value by adding, each time when an unit area comprising the horizontal edge is detected in the image in which the horizontal edge is detected, the horizontal location data of the unit area, and the central location of the face is detected based on the horizontal location data additional value and the number of adding operations.

Thus, the present invention calculates an average value of the horizontal location data based on the horizontal location data additional value and the number of adding operations in order to calculate an average value, the central location of the face can be detected.

Further, according to the central location of a face detecting device, the central location of a face detecting means may calculates a horizontal location data additional value is calculated by adding, each time when an unit area comprising the horizontal edge is detected in the image in which the horizontal edge is detected, a horizontal location data weighed by use of the weighting factor of the unit area, calculate a weighting factor additional value by adding a weighting factor of the detected unit area, and detects the central location of the face based on the horizontal location data additional value and the weighting factor additional value.

Further, the method for detecting a central location of a face may calculates a horizontal location data additional value is calculated by adding, each time when an unit area comprising the horizontal edge is detected in the image in which the horizontal edge is detected, a horizontal location data weighed by use of the weighting factor of the unit area, calculate a weighting factor additional value by adding a weighting factor of the detected unit area, and detects the central location of the face based on the horizontal location data additional value and the weighting factor additional value.

Thus, because he present invention can calculates an average value of the weighed horizontal location data based on the horizontal location data additional value and the weighting factor additional value, even when the driver turns his face in sideways, the central location of the face can be certainly detected without applying additional calculation load.

The central location of a face detecting device, method and program detect a horizontal edge having a predetermined vertical length based on the captured face image, calculate and average value of the horizontal location data of the detected horizontal edge, and determines the average value as the central location of the face, as a result, the central location of the face can be detected rapidly and certainly while a calculation load can be minimized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A central location of a face detecting device comprising:
    an image input means for inputting a captured face image;
    a horizontal band-shaped area detecting means for detecting a horizontal band-shaped area having a predetermined vertical length based on the face image inputted by the image input means; and
    a central location of a face detecting means for calculating an average value of a horizontal location data of the horizontal band-shaped area detected by the horizontal band-shaped area detecting means, and determining the average value as a central location of the face;

wherein, the central location of a face detecting means calculates a weighting factor whose value becomes larger as the horizontal location data moves from a center of the face within the image toward both ends of the image in a horizontal direction, and determines an average value of the horizontal location data weighed by use of the weighting factor as a central location of the face.

2. The central location of a face detecting device according to claim 1 further including a face length detecting means for detecting, based on the image inputted by means of the image input means, lengths of the face in one of a vertical direction and a horizontal direction, wherein the horizontal band-shaped area detecting means determines a range of one of a vertical length and a width of the horizontal band-shaped area based on the lengths of the face in one of a vertical direction and a horizontal direction detected by the face length detecting means, and detects a horizontal band-shaped area that exists within the range.

3. The central location of a face detecting device according to claim 1, wherein the central location of a face detecting means calculates a horizontal location data additional value by adding, each time when an unit area comprising the horizontal band-shaped area is detected in the image in which the horizontal band-shaped area is detected, a horizontal location data of the unit area, and the central location of the face is detected based on the horizontal location data additional value and the number of adding operations.

4. The central location of a face detecting device according to claim 1, wherein, the central location of a face detecting means calculates a horizontal location data additional value by adding, each time when an unit area comprising the horizontal band-shaped area is detected in the image in which the horizontal band-shaped area is detected, a horizontal location data weighed by use of the weighting factor of the unit area, the central location of a face detecting means further calculates a weighting factor additional value by adding a weighting factor of the detected unit area, and thus the central location of the face is detected based on the horizontal location data additional value and the weighting factor additional value.

5. The central location of a face detecting device according to claim 1 further including a capturing means that captures a human face, generates the image based on the captured face image and provides the image to the image input means.

6. A method for detecting a central location of a face including processes of:

using a computer to perform the processes of:
 detecting a horizontal band-shaped area having a predetermined vertical length based on a captured face image;
 calculating an average value of horizontal location data of detected horizontal band-shaped area;
 determining the average value as a central location of the face; and
 calculating a weighting factor whose value becomes larger as the horizontal location data moves from a center of the face within the image toward both ends of the image in a horizontal direction, and determining an average value of the horizontal location data weighed by use of the weighting factor as a central location of the face.

7. The central location of a face detecting method according to claim 6 further including processes of:
 detecting lengths of the face in one of a vertical direction and a horizontal direction based on the captured face image;
 determining a range of one of a vertical length and width of a horizontal band-shaped area based on the detected lengths of the face in one of a vertical direction and a horizontal direction; and
 detecting the horizontal band-shaped area that exists within the determined range.

8. The central location of a face detecting method according to claim 6 calculating a horizontal location data additional value by adding, each time when an unit area comprising the horizontal band-shaped area is detected in the image in which the horizontal band-shaped area is detected, a horizontal location data of the unit area, and detecting the central location of the face based on the horizontal location data additional value and the number of adding operations.

9. The central location of a face detecting method according to claim 6 calculating a horizontal location data additional value by adding, each time when an unit area comprising the horizontal band-shaped area is detected in the image in which the horizontal band-shaped area is detected, a horizontal location data of the unit area weighed by use of the weighting factor, calculating a weighting factor additional value by adding a weighting factor of the detected unit area, and detecting the central location of the face based on the horizontal location data additional value and the weighting factor additional value.

10. A computer-readable medium having embodied therein a program for detecting a central location of a face instructing a computer to execute processes of:
 detecting a horizontal band-shaped area having a predetermined vertical length based on the captured face image,
 calculating an average value of a horizontal location data of the detected horizontal band-shaped area,
 determining the average value as the central location of the face; and
 calculating a weighting factor whose value becomes larger as the horizontal location data moves from a center of the face within the image toward both ends of the image in a horizontal direction, and determining an average value of the horizontal location data weighed by use of the weighting factor as a central location of the face.

11. The central location of a face detecting method according to claim 6,
 wherein the weighting factor becomes a minimum value when the horizontal location data is positioned at the central location of the image and monotone increases as the horizontal location data moves from the central location of the image toward both ends of the image in a horizontal direction.

12. The central location of a face detecting method according to claim 6, wherein the weighed average value of the horizontal band-shaped area is calculated in a manner where a weight on the horizontal band-shaped area is increased as the horizontal location data moves from the central location of the image toward both ends of the image in a horizontal direction.

* * * * *